United States Patent [19]

Tse et al.

[11] Patent Number: 5,548,014
[45] Date of Patent: Aug. 20, 1996

[54] BLENDS OF ETHYLENE COPOLYMERS FOR HOT MELT ADHESIVES

[75] Inventors: Mun F. Tse, Seabrook; Virginia R. Cross; Barry C. Trudell, both of Houston, all of Tex.

[73] Assignee: Exxon Chemical Patents Inc., Wilmington, Del.

[21] Appl. No.: 406,832

[22] Filed: Mar. 20, 1995

Related U.S. Application Data

[63] Continuation of Ser. No. 183,210, Jan. 18, 1994, abandoned, which is a continuation of Ser. No. 970,365, Nov. 2, 1992, abandoned, which is a continuation-in-part of Ser. No. 691,159, Apr. 24, 1991, abandoned, which is a continuation of Ser. No. 406,935, Sep. 13, 1989, abandoned.

[51] Int. Cl.$^6$ .................................................. C09J 123/20
[52] U.S. Cl. ...................... 524/477; 524/483; 524/485; 524/528; 525/240
[58] Field of Search ............................... 524/477, 483, 524/485, 528, 570, 579; 525/240; 526/348, 348.2, 348.3, 348.6

[56] References Cited

U.S. PATENT DOCUMENTS

| | | |
|---|---|---|
| 3,362,940 | 1/1968 | Edwards et al. . |
| 3,492,372 | 1/1970 | Flanagan . |
| 3,514,417 | 5/1970 | Bickel et al. . |
| 3,725,330 | 4/1973 | Shirato et al. . |
| 4,072,735 | 2/1978 | Ardemagni . |
| 4,471,086 | 9/1984 | Foster ........................ 524/489 |
| 4,568,713 | 2/1986 | Hansen et al. . |
| 4,668,575 | 5/1987 | Schinkel et al. .................. 428/349 |
| 4,761,450 | 8/1988 | Lakshmanan et al. ............... 524/488 |
| 4,786,697 | 11/1988 | Cozewith et al. ................... 526/88 |
| 4,808,561 | 2/1989 | Welborn, Jr. ...................... 502/104 |
| 4,824,889 | 4/1989 | Mostert . |
| 4,826,909 | 5/1989 | Lakshmanan et al. . |
| 4,833,192 | 5/1989 | Lakshmanan et al. . |

FOREIGN PATENT DOCUMENTS

| | | |
|---|---|---|
| 0115434 | 8/1984 | European Pat. Off. . |
| 0129368 | 12/1984 | European Pat. Off. . |
| 0208075 | 1/1987 | European Pat. Off. . |
| 0260999 | 3/1988 | European Pat. Off. . |
| 0319043 | 6/1989 | European Pat. Off. . |
| 236804 | 10/1986 | Japan . |
| 121709 | 6/1987 | Japan . |
| 129303 | 6/1987 | Japan . |
| 0057891 | 8/1982 | WIPO . |
| 9003414 | 4/1990 | WIPO . |
| 9212212 | 7/1992 | WIPO . |

OTHER PUBLICATIONS

Billmeyer, Jr., F. W., *Textbook of Polymer Science*, 3rd. ed., Wiley–Interscience, New York, 1984, pp. 361–368.
Exxon in-house publication listing properties of Vistalon 702 (No date).

*Primary Examiner*—Romulo H. Delmendo
*Attorney, Agent, or Firm*—Catherine L. Bell; Frank E. Reid

[57] ABSTRACT

Disclosed are hot melt adhesives comprising tackifier and a high $M_w$, narrow MWD, narrow CD ethylene/alpha-olefin copolymer(s) and a low $M_w$, narrow MWD, narrow MWD ethylene/alpha-olefin copolymer prepared with either supported or unsupported cyclopentadienyl derivatives of Group IV and catalysts for applications in hot melt adhesives, particularly in automotive product assembly, packaging and food packaging. These ethylene copolymers have a $M_w$ ranging from about 20,000 to about 100,000, an MWD of less than 6 and 3 to 17 mole percent comonomer, and composition distribution breadth index above 70 percent. These ethylene copolymer blends have a $M_w$ ranging from about 20,000 to about 100,000 and an MWD of less than 6. In addition, the copolymer blends have comonomer mole percent ranging from about 3 to about 17.

21 Claims, No Drawings

5,548,014

BLENDS OF ETHYLENE COPOLYMERS FOR HOT MELT ADHESIVES

This is a continuation of application Ser. No. 08/183,210, filed Jan. 18, 1994, abandoned, which is a continuation of application Ser. No. 07/970,365, filed Nov. 2, 1992, abandoned, which is a continuation-in-part of application Ser. No. 07/691,159, filed Apr. 24, 1991, abandoned, which is a continuation of application Ser. No. 406,935, filed Sep. 13, 1989, abandoned.

BACKGROUND OF THE INVENTION

1. Field of the Invention

This invention relates to hot melt adhesives based on ethylene copolymers. In particular, the invention relates to hot melt adhesives especially comprising ethylene alpha-olefin copolymers wherein the alpha-olefin can have from 3–20 carbon atoms such as ethylene/butene-1, ethylene/hexene-1, ethylene/octene-1, and ethylene/4-methylpentene-1 copolymers. These ethylene copolymers with prescribed range of comonomer levels can be prepared by polymerization of the suitable olefins in the presence of supported or unsupported cyclopentadienyl transition metal compounds and organo aluminum reagent catalyst systems.

2. Background of the Invention

Hot melt adhesives are mixtures of polymer and adjuvants, usually tackifying resin, wax, or low $T_g$ materials such as oils and low molecular weight polymers. The polymer contributes cohesive strength to the final formulation. It is well known that highly crystalline polymers show very poor adhesive performance at temperatures below room temperature due to brittleness. Hence, somewhat elastic polymers are most useful in hot melt adhesives. In addition, the presence of comonomer improves adhesion of the final hot melt adhesive formulation to metal and polar substrates such as aluminum and glass.

Copolymers of ethylene and a mono-olefinically unsaturated polar comonomer such as vinyl acetate, methyl acrylate, acrylic acid and the like, have been reported as useful polymers to formulate into hot melt adhesives, however, these hot melt adhesives are generally lacking in elevated temperature performance. These hot melt adhesives, although useful with polar substrates, are less useful with non-polar substrates.

Hot melt adhesives prepared with EVA (ethylene/vinyl acetate copolymer) containing high levels of vinyl acetate are generally ineffective in laminating non-polar plastic surfaces to the same plastic surfaces or to other surfaces. For example, polypropylene is widely used for product assembly in automobile industry due to low cost and solvent resistance. The polypropylene parts require a hot melt adhesive that will bond the polypropylene as well as to parts made of different polymers or to other substrates such as steel, aluminum, glass, etc. Each of the different polymers or substrates may have different bonding requirements, such as polarity, etc. Besides excellent adhesion, another highly desirable requirement of the hot melt composition is its elevated temperature properties. Besides product assembly applications, polypropylene is widely used in film and in cast sheet form for packaging articles and for packaging food and such packaging requires closure which can resist mechanical breakage.

U.S. Pat. No. 4,072,735 discloses the preparation of a hot melt pressure sensitive adhesive which comprises ethylene-propylene rubber, tackifying resin, polybutene, and, optionally, a crystalline polypropylene. The addition of the crystalline polypropylene is most likely required in order to obtain a useful adhesive at elevated temperatures.

U.S. Pat. No. 4,568,713 discloses a hot melt adhesive system comprising butene-1/ethylene copolymer (containing 5.5–10.0 weight percent ethylene), an aliphatic/non-polar tackifier, an antioxidizing agent and, optionally, microcrystalline wax. The patent discloses utility for long open time and the need for good cold metal bonding to steel and aluminum.

JP-62-129303 discloses the preparation of ethylene/alpha-olefin copolymers using metallocene-alumoxane catalysts. The products obtained are olefin copolymers having narrow molecular weight distributions and relatively low softening points. These copolymers are waxes characterized by only slight surface stickiness or slight adhesiveness, and are therefore used as pigment dispersing agents and toners.

JP-61-236B04 discloses preparing narrow molecular weight distribution ethylene/alpha-olefin copolymers with metallocene-alumoxane catalysts. However, these ethylene/alpha-olefin copolymer products are also waxes that are used as pigment dispersants and resin processing aids. No adhesive characteristics are taught for these products.

JP-62-121709 pertains to the copolymerization of ethylene with an alpha-olefin in the presence of a catalyst comprising a zirconium hydride compound such as a bis-(cyclopentadienyl) zirconium monochlorohydride and an alumoxane to obtain a copolymer which is narrow in both molecular weight distribution and composition distribution. However, while the copolymer is excellent in transparency, impact resistance and heat sealability, it is also characterized by surface non-stickiness.

There is an apparent need in the art to obtain hot melt adhesives having improved elevated temperature properties, and better low temperature flexibility.

In copending application, Ser. No. 07/691,159, filed Apr. 24, 1991, which is continuation in part of U.S. Ser. No. 406,935 filed Sep. 13, 1989, it was disclosed that hot melt adhesives based on ethylene copolymers provide good adhesive performance on plastic surfaces, in particular surfaces comprising polypropylene and polyethylene. U.S. Ser. No. 691,159 also disclosed a hot melt adhesive which does not need the addition of an elastomer to modify final performance such as increased high temperature resistance and improved adhesion on non-polar surfaces.

U.S. Ser. No. 691,159 discloses that ethylene/alpha-olefin copolymers having a certain molecular weight range and a certain comonomer level range can be utilized in formulating an adhesive formulation absent an elastomer when the copolymers are prepared in the presence of a catalyst system comprising a Group IVB transition metal-cyclopentadienyl containing catalyst such as, for example, either supported or unsupported cyclopentadienyl transition metal compounds and organo aluminum reagents catalyst systems. The hot melt adhesive formulations of U.S. Ser. No. 691,159 comprise the copolymers, tackifier(s), and optionally, wax or oil. In hot melt adhesive applications, the weight average molecular weight ($M_w$) values of the base copolymer will range from about 20,000 to about 100,000, preferably from 30,000 to 80,000, and the comonomer level will range from about 3 mole percent to about 17 mole percent, preferably from 5 mole percent to 11 mole percent.

SUMMARY OF THE INVENTION

It is an objective of this invention to provide hot melt adhesives based on ethylene copolymers which provide good adhesive performance on plastic surfaces, in particular polypropylene and polyethylene. It is another objective of this invention to provide a hot melt adhesive which does not need the addition of an elastomer to modify final performance such as increased high temperature resistance and improved adhesion on non-polar surfaces.

It was surprisingly found and disclosed in copending application U.S. Ser. No. 07/691,159 that ethylene/alpha-olefin copolymers having certain molecular weight ranges and certain comonomer level ranges can be utilized in formulating an adhesive formulation absent an elastomeric resin when the copolymers are prepared in the presence of a catalyst system comprising a Group IVB transition metal-cyclopentadienyl containing catalyst such as, for example, either supported or unsupported cyclopentadienyl transition metal compounds and organo aluminum reagent catalyst systems. Hot melt adhesive formulations comprise one of these copolymers, tackifier(s), and optionally, wax or oil. It has further been discovered that a substantial improvement in adhesive performance and an enhancement in adhesive tensile strength can be accomplished by blending a high molecular weight (or low melt index) ethylene copolymer into a low molecular weight (or high melt index) ethylene copolymer to make up the ethylene copolymer constituent of the HMA.

The molecular weight distribution (MWD) is determined via the conventional technique of Gel Permeation Chromatography (GPC). The distribution of chemical composition or composition distribution (CD) as reflected in the Composition Distribution Breadth Index (CDBI) is determined via techniques known in the art, such as for example, Temperature Rising Elution Fractionation (TREF) as described, for example, in U.S. Pat. No. 5,008,204, or in Wild et al., *J. Polym. Sci., Polym. Phys, Ed.,* 20, 441(1982). CDBI is defined as the weight percent of the copolymer molecules having a comonomer content within 50 percent of the median total molar comonomer content. The CDBI of a linear polyethylene, which does not contain a comonomer, is defined to be 100 percent. CDBI determination clearly distinguishes the ethylene copolymer blends of this invention (narrow CD as assessed by CDBI values generally above 70 percent) from Very Low Density Polyethylene (VLDPE) available commercially today (broad CD as assessed by CDBI values generally less than 55 percent). The benefit to the subject invention that accrues through the specific use of ethylene copolymer blends of narrow CD are elucidated later in the examples.

In hot melt adhesive applications, the weight average molecular weight ($M_w$) values of the copolymers of this invention will range from about 20,000 to about 100,000, preferably from 30,000 to 80,000. In addition, the polymer desirably has a narrow MWD as reflected in the ratio of weight average molecular weight $M_w$ to number average molecular weight ($M_n$), or $M_w/M_n$, of less than 6, and preferably less than 4. Comonomer level of the polymer will range from about 3 mole percent to about 17 mole percent. Preferably from 5 mole percent to 11 mole percent.

The ethylene-co-alpha olefin polymers of the present invention can be produced in accordance with any known polymerization process, including a slurry polymerization, gas phase polymerization, and high pressure polymerization process.

A slurry polymerization process generally uses super-atmospheric pressures and temperatures in the range of 40°–110° C. In a slurry polymerization, a suspension of solid, particulate polymer is formed in a liquid polymerization medium to which ethylene and comonomers and often hydrogen along with catalyst are added. The liquid employed in the polymerization medium can be an alkane, cycloalkane, or an aromatic hydrocarbon such as toluene, ethylbenzene or xylene. The medium employed should be liquid under the conditions of polymerization and relatively inert. Preferably, hexane or toluene is employed.

The polymer components of the present invention may be formed by gas-phase polymerization. A gas-phase process utilizes super-atmospheric pressure and temperatures in the range of about 50°–120° C. Gas phase polymerization can be performed in a stirred or fluidized bed of catalyst and product particles in a pressure vessel adapted to permit the separation of product particles from unreacted gases. Thermostated ethylene, comonomer, hydrogen and an inert diluent gas such as nitrogen can be introduced or recirculated so as to maintain the particles at a temperature of 50°–120° C. Triethylaluminum may be added as needed as a scavenger of water, oxygen, and other adventitious impurities. Polymer product can be withdrawn continuously or semi-continuously at a rate such as to maintain a constant product inventory in the reactor. After polymerization and deactivation of the catalyst, the product polymer can be recovered by any suitable means. In commercial practice, the polymer product can be recovered directly from the gas phase reactor, freed of residual monomer with a nitrogen purge, and used without further deactivation or catalyst removal.

The polyethylene copolymers of the present invention can also be produced in accordance with a high pressure process by polymerizing ethylene in combination with other monomers such as butene-1, hexene-1, octene-1, or 4-methylpentene-1 in the presence of the catalyst system comprising a cyclopentadienyl-transition metal compound and an organo aluminum reagent. As indicated more fully hereinafter, it is important, in the high-pressure process, that the polymerization temperature be above about 120° C. but below the decomposition temperature of said product and that the polymerization pressure be above about 500 bar (kg/cm$^2$). In those situations wherein the molecular weight of the polymer product that would be produced at a given set of operating conditions is higher than desired, any of the techniques known in the prior art for control of molecular weight, such as the use of hydrogen or reactor temperature, may be used in the process of this invention. As an improvement upon these copolymers and over other conventional hot melt adhesives, this invention blends two copolymers together, each with specific CD and MWD requirements, to obtain greater substrate adhesion, and a higher tensile strength of the hot melt adhesive formulation.

DETAILED DESCRIPTION OF THE INVENTION

The ethylene copolymer(s) adhesive formulations of this invention comprise blends of base ethylene/alpha-olefin copolymers, each of the copolymers being prepared in the presence of Group IVB (66th Edition of Handbook of Chemistry and Physics, CRC Press, 1985–1986, CAS version) transition metal, cyclopentadienyl containing catalysts. The copolymers are ethylene/alpha-olefin copolymers wherein the alpha-olefin can have from 3 to 20 carbon atoms. Illustrative of the alpha-olefins are butene-1, hexene-1, octene-1 and 4-methylpentene-1. The copolymers can also include a minor amount of alpha-nonconjugated diene such as 1,4-hexadiene, 4-methyl-1,4-hexadiene, 5-methyl-1, 4-hexadiene, alpha-omega-diene such as 1,4-pentadiene, 1,5-hexadiene, and norbornene derivative such as 5-ethylidene-2-norbornene, dicyclopentadiene typically up to 2 mole percent.

In particular the hot melt adhesives of this invention comprise a blend of two or more ethylene/alpha-olefin copolymers and one or more tackifiers. The copolymers blended in this invention are typically a low weight average molecular weight $M_w$, narrow molecular weight distribution (MWD), narrow composition distribution(CD) component blended with a high $M_w$, narrow MWD and narrow CD component. The high molecular weight component is present at 5 to 60 weight percent based upon the weight of the total polymer blend, preferably 10 to 50 weight percent, more preferably 20 to 40 weight percent. The low molecular weight component is present at 40 to 95 weight percent, preferably 50 to 90 weight percent, more preferably 60 to 80 weight percent. The tackifier component is present at 10 to 90 weight percent based upon the weight of the total polymer and tackifier blend, preferably 30 to 70 weight percent, more preferably 40 to 60 weight percent. The tackifier component may be a mixture or blend of one or more liquid or solid tackifiers.

Preferably, the hot melt adhesive (HMA) composition comprises the copolymer blend, solid tackifier and liquid tackifier. Also, a desirable HMA can comprise the copolymer blend and one or the other of the solid and liquid tackifiers, but preferably the solid tackifier. One particular adhesive blend is a 50,000 $M_w$ ethylene/butene-1 copolymer (butene-1: weight percent=16) (butene-1: mole percent=8.7) blended with a 29,000 $M_w$ ethylene/butene-1 copolymer (butene-1: weight percent=17) (butene-1: mole percent=9.3) with a solid aliphatic tackifier, Escorez 1310LC, and a liquid aliphatic tackifier. Another example is a 50,000 $M_w$ ethylene/butene-1 copolymer (butene-1: weight percent=16) (butene-1: mole percent=8.7) blended with a 29,000 $M_w$ ethylene/butene-1 copolymer (butene-1: weight percent=17) (butene-1: mole percent=9.3) with a solid hydrogenated oligo(cyclopentadiene) tackifier, Escorez 5380.

The blend of the two copolymer components may be chosen such that the blend may have a unimodal MWD and a bimodal CD (narrow MWD/broad CD); bimodal MWD and a unimodal CD (broad MWD/narrow CD); a multimodal MWD with a unimodal CD (broad MWD/narrow CD); an unimodal MWD with a multimodal CD (narrow MWD/broad CD); or a multimodal MWD with a multimodal CD (broad MWD/broad CD).

Paraffinic wax or microcrystalline wax is desirably used in the hot melt adhesive composition when low melt viscosity is desired. Depending on the nature and amount of the tackifiers used, wax may comprise from zero to 30 weight percent of the adhesive composition, preferably from zero to 20 weight percent of the adhesive composition. The hot melt composition may also include conventional additives such as pigments, fillers, antioxidants, stabilizers, and the like, in conventional amounts, but the hot melt is preferably essentially free of solvents. Antioxidants such as Irganox 1010, when used, are typically present at 0.5 weight percent of the hot melt adhesive composition.

The ethylene copolymers of this invention are prepared using a Group IV cyclopentadienyl derivative catalyst system comprising supported or unsupported catalyst preferably prepared by combining at least two components. In one preferred method, the first component is a cyclopentadienyl derivative of a Group IV metal compound containing at least one ligand which will combine with the second component or at least a portion thereof such as a cation portion thereof. The second component is an ion-exchange compound comprising a cation which will irreversibly react with at least one ligand contained in said Group IV metal compound (first component) and a non-coordinating anion which is either a single coordination complex comprising a plurality of lipophilic radicals covalently coordinated to and shielding a central formally charge-bearing metal or metalloid atom or an anion comprising a plurality of boron atoms such as polyhedral boranes, carboranes and metallacarboranes.

The cation portion of the second component may comprise Bronsted acids such as protons or protonated Lewis bases or may comprise reducible Lewis acids such as ferricinium, tropylium, triphenylcarbenium or silver cations.

In another preferred method, the second component is a Lewis-acid complex which will react with at least one ligand of the first component, thereby forming an ionic species with the ligand abstracted from the first component now bound to the second component. Alumoxanes and especially methylalumoxane, the product formed from the reaction of trimethylaluminum in an aliphatic or aromatic hydrocarbon with stoichiometric quantities of water, are particularly preferred Lewis-acid second components.

The polymerization processes used to make the ethylene/alpha-olefin copolymers of this present invention make use of various forms of single-sited catalysts and catalyst systems, some examples of which are discussed above. Exemplary of development of such catalysts are U.S. Pat. No. 4,937,299 to Ewen, et al. and EP-A-0 129 368 hereby fully incorporated by reference. The following U.S. Patents, U.S. patent applications and publications all describe and define the terms single-site catalysts and single-site catalyst systems for purposes of this present application for a U.S. Patent: U.S. Pat. Nos. 4,701,432; 4,808,561; 4,897,445; 4,937,217; 4,937,301; 4,912,075; 4,914,253; 4,925,821; 5,006,506; 5,008,228; 5,017,665; 5,026,798; 5,057,475; 5,055,438; 5,096,867, U.S. patent application Ser. Nos. 133,052; 133,480; 542,236, PCT International Publication WO92/00333, WO91/04257, EP-A-0 420 436, EP-A-0 277 003 and EP-A-0 277 004, all of which are hereby fully incorporated by reference.

The ethylene copolymers and their blends may be used as an adhesive layer in the metallic or polymeric laminate by conventional laminating techniques, such as, for example, coextrusion, extrusion coating, and the like. In a preferred embodiment, the ethylene copolymer blend is applied to the substrate as a hot melt adhesive containing the polymer blend and a compatible solid and/or liquid tackifier. The solid tackifiers typically have a softening point of from 70° to 130° C., preferably from 80° to 120° C.; a number average molecular weight of from 500 to ].300, preferably from 700 to 1300; a weight average molecular weight of from 1000 to 3000, preferably from 1200 to 2500; and a specific gravity of from 0.80 to 1.30. As suitable tackifiers these may be mentioned, aliphatic resins, polyterpene resins, hydrogenated resins and mixed aliphatic-aromatic resins well known in the art. Exemplary aliphatic resins include those available under the trade designations Escorez, Piccotac, Hercules, Wingtack, HiRez, Quintone, Tackirol, etc. Exemplary polyterpene resins include those available under the trade designations Nirez, Piccolyte, Wingtack, Zonarez, etc. Exemplary hydrogenated resins include those available under the trade designations Escorez, Arkon, Clearon, etc. Exemplary mixed aliphatic-aromatic resins include those available under the trade designations Escorez, Regalite, Hercules AR, Imprez, Norsolene M, Marukarez, Arkon M, Quintone, etc. Other tackifiers may also be employed, provided they are compatible with the ethylene copolymers. The liquid tackifier chosen is compatible with the solid tackifier used in the formulation. These liquid tackifiers typically have a softening point of from 10° to 40° C. and a weight average molecular weight of from 300 to 600. Depending on the nature and amount of the solid tackifiers used, liquid tackifier may comprise from zero to 30 weight percent of the adhesive composition.

The hot melt adhesive is prepared by conventionally melt blending the components together at elevated temperature (from about 150° to about 200° C.) under an inert gas blanket until a homogeneous mix is obtained. Any mixing method producing homogeneous blend without degrading the hot melt components is satisfactory. One well known method to the art of blending materials of this type is to carry out the hot melt blending in a heated vessel equipped with a stirrer. The molten adhesive was then poured onto a silicone coated release paper and smoothed to a thickness of about 6 mils by drawing a heated bar across the adhesive layer. The adhesive film, after being cooled down and peeled off from the release paper, was used for subsequent adhesive tests.

The hot melt adhesive, in addition to having enhanced adhesion to various substrates such as aluminum, polyethylene, and polypropylene, has the further advantage that the hot melt composition has good elevated temperature properties such as SAFT and PAFT compared to commercial EVA hot melt compositions.

TESTING METHODS

1. Compatibility—The cloud point is the temperature at which the clear and molten adhesive composition cools to give the first indication of a cloud or haze. It provides a measure of compatibility of tackifier in a hot melt adhesive compound.

2. T-Peel Strength—T-Peel strength is defined as the average load per unit width of bond line required to produce progressive separation of 2 bonded adherends. Separation speed is 2 inches/minute.

3. Shear Adhesion Failure Temperature (SAFT)—One inch×one inch lap shear bonds to Kraft paper are prepared. Samples are hung vertically in an air circulating oven at 30° C. and a 500 gram weight is suspended from the bottom strip. The oven temperature is raised 10° F. every 15 minutes. The shear-fail temperature is the average of three readings.

4. Peel Adhesion Failure Temperature (PAFT)—One inch×three inch adhesive bonds to Kraft paper are prepared. Samples are hung horizontally (in peel mode) in an air circulating oven and a 100 gram weight is suspended from the free end of the bond. The oven temperature is raised 10° F. every 15 minutes. The peel-fail temperature is the average of three readings.

5. Polymer Melt Index—Melt Index (abbreviated MI) was measured according to ASTM D1238, condition E, 190° C., and 2.16 kg. These are typical conditions used for polyethylenes and EVA polymers.

6. Crystalline Melting Point (abbreviated $T_m$)—$T_m$ was determined by Differential Scanning Calorimetry (abbreviated DSC). Heating and cooling rates were 10° C./minute. $T_m$ is the temperature at which a maximum occurs in the heat absorption curve.

7. Gel Permeation Chromatography (abbreviated GPC)—copolymer and copolymer blend $M_n$, $M_w$ and $M_w/M_n$ were measured by a Waters GPC 150° C. instrument equipped with a four-column ultra-styragel set with porosities of $10^3$, $10^4$, $10^5$ and $10^6$ Angstroms, operated at 145° C. The mobile phase was 1,2,4-trichlorobenzene. The columns were calibrated over the molecular weight range of 5,000–350,000 using narrow molecular weight distributed linear polyethylene standards from NIST (National Institute of Standards and Testing).

8. Composition Distribution (abbreviated CD) via Temperature Rising Elution Fractionation (abbreviated TREF)—Copolymer and copolymer blend composition distribution breadth index (abbreviated CDBI) was measured by a CD separation instrument based on a well known principle: the solubility of a crystalline copolymer is a strong function of temperature. The heart of the instrument is a column packed with solid glass beads. A dilute solution of the copolymer or copolymer blend of interest, in tetrachloroethylene, was prepared and placed in the column at 120° C. The temperature was then ramped rapidly down to 0° C. This caused the polymer to crystallize out of the quiescent solution onto the surface of the beads. Pure solvent (tetrachloroethylene) was pumped through the column while the temperature was programmed upward at a controlled rate to 120° C. An infrared detector continuously measured the concentration of polymer in the effluent from the column, and a continuous solubility distribution curve was obtained.

The invention is illustrated by way of the following examples.

EXAMPLES 1 AND 2

The catalyst for polymerizing the ethylene copolymers was prepared as follows. An 800 gram quantity of silica gel and a 2700 ml aliquot of methylalumoxane/toluene solution (10 percent) were placed in a two-gallon reactor and allowed to react at ambient temperature for one hour. A 21.6 gram quantity of bis(indenyl) zirconium dichloride slurried in 300 ml of toluene was added into the reactor and the mixture was allowed to react at 65° C. for 30 minutes. The reactor was then heated at 75° C. while nitrogen gas was purged through the reactor to remove the solvent. The heating and nitrogen purging were stopped when the mixture in the reactor turned into a free-flowing powder.

The polymerization was conducted in a 16-inch diameter fluidized bed gas-phase reactor. Ethylene, butene-1, and nitrogen were fed continuously into the reactor to maintain a constant production rate. Product was periodically removed from the reactor to maintain the desired bed weight. The polymerization conditions are shown in Table I.

TABLE I

| Gas Phase Polymerization | |
| --- | --- |
| Temperature (°F.) | 143 |
| Total Pressure (psia) | 300 |
| Gas Velocity (ft/sec) | 1.5 |
| Catalyst Feed Rate (g/hr) | 11 |
| Production Rate (lb/hr) | 29 |

The polymerized product had a number average molecular weight ($M_n$) of 20,000, a weight average molecular weight ($M_w$) of 50,000, and hence a ratio of $M_w$ to $M_n$ of 2.50. The polymer had values of MI and $T_m$ of 24° and 79° C., respectively. The polymer had a viscoelastic loss peak as determined on a Rheometrics System IV Spectrometer at −46° C. The Rheometrics System IV spectrometer measures glass transition temperature, $T_g$. $T_g$ is important to hot melt adhesive performance, as it is an indication of low temperature use levels. Butene-1 weight percent in the polymer was 16 (mole percent=8.7) and specific gravity of the polymer is 0.898. Hot melt adhesive performance of compositions based on this ethylene copolymer was compared to compositions based on an EVA copolymer (Table II). EVA based HMA compositions are illustrative of commercial and conventional HMA's. This EVA polymer had an $M_n$ of 19,000, an $M_w$ of 41,000, and hence an $M_w/M_n$ ratio of 2.16. This EVA polymer had values of MI and $T_m$ of 32 and 69° C., respectively. This polymer had a viscoelastic loss peak at −29° C. Vinyl acetate weight percent in the polymer is 28 and specific gravity of the polymer is 0.934. Escorez 2393 is a mixed aliphatic-aromatic resin. Foral 105 is a rosin ester. Escorez 5380 and Escorez 5300 are hydrogenated cyclic solid resins. Resin A is a hydrogenated cyclic liquid hydrocarbon resin which has a softening point of 37° C., a $M_w$ of 340, $M_w/M_n$= 3.3, and $T_g$=−13° C. Aristowax 165 is a paraffinic wax with $T_m$ of 68° C.

TABLE II

| Formulation | Comparative Examples A | Comparative Examples B | Example 1 | Example 2 |
|---|---|---|---|---|
| EVA | 45 | 45 | — | — |
| Ethylene/Butene-1 Copolymer | — | — | 45 | 45 |
| Escorez 2393 | 45 | — | — | — |
| Foral 105 | — | 45 | — | — |
| Escorez 5380 | — | — | 45 | — |
| Escorez 5300 | — | — | — | 45 |
| Resin A | — | — | — | 10 |
| Aristowax 165 | 10 | 10 | 10 | — |
| Properties | | | | |
| Brookfield Viscosity @ 180° C., Pa.s | 14.4 | 11.5 | 47.0 | 67.0 |
| Cloud Point, °C. | 77 | 59 | 118 | 116 |
| Tensile Stress at 1000% Elongation, psi | 950 | 800 | 420 | 500 |
| T-Peel, lb/in | | | | |
| Aluminum | 4.1 | 5.6 | 6.3 | 2.2 |
| Polyethylene | 0.5 | 3.4 | 7.3 | 2.3 |
| Polypropylene | 0.3 | 3.3 | 16.2 | 4.0 |
| SAFT, Kraft, 1" × 1" × 500 g, °C. | 70 | 75 | 90 | 93 |
| PAFT, Kraft, 1" × 3" × 100 g, °C. | 59 | 55 | 51 | 64 |
| Cold Flexibility, −20° C./16 hour | | | Paper Tear | |

All hot melt formulations contained 0.5 weight percent of Irganox 1010 based on total adhesive blend weight. It was surprisingly found that hot melts based on the ethylene/butene-1 copolymer showed excellent peel strength with metallic and polyolefin substrates when compared with conventional EVA formulation, and high SAFT and PAFT values. The bonding conditions for T-Peel specimens were 177° C./40 psi/2 seconds for aluminum substrates, and 149° C./40 psi/2 seconds for both the polyethylene and polypropylene substrates. All these substrates were untreated.

EXAMPLES 3 and 4

The identical ethylene/butene-1 copolymer as discussed above, was used to prepare two hot melt adhesive compositions based on aliphatic resins Escorez 1310LC and hydrogenated aliphatic resins Resins B and C (Table III). Resin B is a solid hydrogenated aliphatic resin. Resin C is a liquid hydrogenated aliphatic resin. The softening points of Resins B and C are 75° and 24° C., respectively, the $M_w$ 1,400 and 460, respectively. $M_w/M_n$=1.5 and 1.4, respectively and $T_g$=25° and −26° C., respectively. The performance results of these formulations are summarized in Table III.

TABLE III

| Formulation | Example 3 | Example 4 |
|---|---|---|
| Ethylene/Butene-1 Copolymer | 45 | 45 |
| Escorez 1310LC | — | 30 |
| Resin B | 40 | — |
| Resin C | 15 | 25 |
| Properties | | |
| Brookfield Viscosity @ 180° C. Pa.s | 42.0 | 46.0 |
| Cloud Point, °C. | 117 | 112 |
| Tensile Stress at 1000% Elongation, psi | 200 | 200 |
| T-Peel, lb/in | | |
| Aluminum | 1.8 | 11.9 |
| Polyethylene | 1.7 | 0.9 |
| Polypropylene | 13.3 | 12.7 |
| SAFT, Kraft, 1" × 1" × 500 g °C. | 92 | 89 |
| PAFT, Kraft, 1" × 3" × 100 g °C. | 53 | 54 |
| Cold Flexibility, −20° C./16 hours | Paper Tear | |

It was surprisingly found that hot melts based on the ethylene/butene-1 copolymer showed excellent peel strength with metallic and polyolefin substrates, especially with polypropylene, and high SAFT and PAFT values. The bonding conditions for T-Peel specimens were identical to conditions used in Examples 1 and 2. All these substrates were untreated.

EXAMPLES 5 and 6

The procedures of Examples 1 and 2 were followed to prepare the catalyst and the ethylene copolymer except that hexene-1 was used as the alpha-olefin monomer. The polymerized product had an $M_n$ of 28,000, an $M_w$ of 54,000, and an $M_w/M_n$ ratio of 1.93. The polymer had values of MI and $T_m$ of 14 and 96° C., respectively. The polymer had a viscoelastic loss peak as determined on a Rheometric System IV Spectrometer at −52°. Hexene-1 weight percent in the copolymer was 16 (mole percent=6.0) and specific gravity of the polymer is 0.901. This polymer was used to prepare two hot melt compositions based on aliphatic resins Escorez 1310LC, and Resins B and C (Table IV). All hot melts contained 0.5 weight percent of Irganox 1010 based on total adhesive blend weight. It was surprisingly found that hot melts based on the ethylene/hexene-1 copolymer showed good peel strength with metallic and polyolefin substrates, and high SAFT and PAFT values. Therefore, this ethylene/hexene-1 copolymer formulated into HMA's showed similar substantial and unexpected improvements over conventional EVA formulations. The bonding conditions for T-Peel specimens were identical to conditions used in Examples 1 and 2. All the substrates were untreated.

TABLE IV

| Formulation | Example 5 | Example 6 |
|---|---|---|
| Ethylene/Hexene-1 Copolymer | 45 | 45 |
| Escorez 1310LC | — | 30 |
| Resin B | 40 | — |
| Resin C | 15 | 25 |
| Properties | | |
| Brookfield Viscosity @ 180° C. Pa.s | 76.0 | 73.0 |

TABLE IV-continued

| Formulation | Example 5 | Example 6 |
|---|---|---|
| Cloud Point, °C. | 119 | 111 |
| Tensile Stress at 1000% Elongation, psi | 580 | 600 |
| T-Peel, lb/in | | |
| Aluminum | 8.0 | 2.6 |
| Polyethylene | 0.3 | 0.6 |
| Polypropylene | 8.9 | 1.0 |
| SAFT, Kraft, 1" × 1" × 500 g, °C. | 92 | 94 |
| PAFT, Kraft, 1" × 3" × 100 g, °C. | 72 | 70 |
| Cold Flexibility, −20° C./16 hours | Paper Tear | |

COMPARATIVE EXAMPLES

Two linear low density polyethylenes LLDPE-1 and LLDPE-2 were then used as base resins in formulations similar to those used in Examples 1–6. Both LLDPE-1 and LLDPE-2 are ethylene/hexene-1 copolymers commercially manufactured. These two polyethylenes were used to demonstrate the effects of percent comonomer incorporation on HMA performance. Both of these polymers (LLDPE-1 and LLDPE-2) contain at most 5.3 weight percent or 1.9 mole percent hexene-1 and have broad CD and broad MWD.

These two copolymers, LLDPE-1 and LLDPE-2, are exemplary of polymers that bear resemblance to those of the present invention, but have lower percent comonomer incorporation. LLDPE-1 and LLDPE-2 were used to prepare hot melt adhesive compositions containing hydrogenated cyclic resins Escorez 5300, Escorez 5380, and Resin A (Table V). LLDPE-1 and LLDPE-2 had values of MI/specific gravity of 55/0.926 and 12/0.926, respectively. All hot melts contained 0.5 weight percent of Irganox 1010 based on total adhesive blend weight. The peel strength with untreated polypropylene of the LLDPE formulated hot melts was inferior to the ethylene copolymeric hot melts in Examples 1–6. The bonding conditions for the T-Peel specimens in Table V was 150° C./40 psi/10 seconds.

TABLE V

| | Comparative Examples | | |
|---|---|---|---|
| Formulation | C | D | E |
| LLDPE-1 | 45 | — | 40 |
| LLDPE-2 | — | 45 | — |
| Escorez 5300 | 45 | 45 | — |
| Escorez 5380 | — | — | 40 |
| Resin A | 10 | 10 | 20 |
| Viscosity* @ 180° C., Pa.s | 46.0 | 180 | — |
| T-Peel, lb/in Polypropylene | 0.4 | 0.5 | 0.5 |

*Complex viscosity as determined by Rheometrics System IV Spectrometer.

As can be seen adhesion to polypropylene, for example, drops precipitously.

Examples 7–15 are demonstrative of the further unexpected results obtained by blending at least two copolymers formed in accordance with the method discussed above.

EXAMPLE 7, 8 and 9

In Table VI, two ethylene/butene-1 copolymers, Copolymer B and Copolymer C, and the ethylene/butene-1 copolymer described in Examples 1 and 2 were used to prepare three hot melt compositions based on Escorez 1310LC and Resin C. Irganox 1010 was added as an antioxidant. Both Copolymer B and Copolymer C were made by the process described in Examples 1 and 2. The weight percent of butene-1 in the copolymer was 18 (mole percent=9.9) for Copolymer B and 17 for Copolymer C (mole percent=9.3). The melt indices for Copolymer B and Copolymer C were 108 and 230 respectively. Copolymer B and Copolymer C had $M_n$ values of 12,000 and 10,000; $M_w$ values of 33,000 and 29,000; $M_w/M_n$ ratios of 2.75 and 2.90; and CDBIs of 94.03 percent and 72.29 percent, respectively. They had $T_m$ and specific gravity values of 81° C. and 83° C., and 0.894 and 0.896, respectively.

As shown in Table VI, a portion of the low melt index Ethylene/Butene-1 copolymer described in Examples 1 and 2 was blended into the high melt index Copolymer C so that the melt index of the resulting copolymer blend was 108, identical to that of Copolymer B. The CDBI value of the low melt index Ethylene/Butene-1 Copolymer was 72.78 percent. The blend was prepared according to the following equations:

$$\log M_w = 5.061 - 0.2539 \log MI$$

and $$M_w = W_1 M_{w1} + W_2 M_{w2} + \ldots$$

where $W_1$ and $W_2$ are the weight fractions of the two copolymers. The copolymer blend had weight percent butene-1 of 16.7 (mole percent=9.2), $M_w$ of 30,000, $M_n$ of 8,000, $M_w/M_n$ of 3.75 and CDBI of 94.15 percent.

The similarity between the copolymer blend, Copolymer B and Copolymer C is that they all have narrow CD's, as reflected by their high CDBI values. Their difference is that the copolymer blend has a broad MWD, as reflected by its high $M_w/M_n$ value, whereas both Copolymer B and Copolymer C have narrow MWD's, as reflected by their low $M_w/M_n$ values.

All of the hot melt compositions contained 0.5 weight percent Irganox 1010 based on the total weight of the adhesive blend. The bonding conditions for T-Peel specimens were 150° C., 40 psi and 10 seconds for the untreated polypropylene substrate.

The results are summarized in the Table VI.

TABLE VI

| | Examples | | |
|---|---|---|---|
| Formulation | 7 | 8 | 9 |
| Copolymer B | — | 45 | — |
| Copolymer C | 32.1 | — | 45 |
| Ethylene/Butene-1 Copolymer | 12.9 | — | — |
| Escorez 1310LC | 30 | 30 | 30 |
| Resin C | 25 | 25 | 25 |
| Properties | | | |
| Brookfield Viscosity @ 180° C., Pa.s | 9.8 | 8.4 | 4.3 |
| SAFT, Kraft 1" × 1" × 500 g, °C. | 81 | 79 | 79 |
| Tensile Strength, psi | 170 | 130 | 110 |
| Elongation, % | 1,000 | 600 | 300 |
| T-Peel, lb/in Polypropylene | 7.0 | 4.4 | 2.9 |

When compared to Formulation 8, hot melt adhesive based on Copolymer B (narrow MWD/narrow CD), and Formulation 9, hot melt adhesive based on Copolymer C (narrow MWD/narrow CD), Formulation 7, hot melt adhesive based on blend of Copolymer C and Ethylene/Butene-1 Copolymer (broad MWD/narrow CD), has enhanced bond strength with polypropylene, better adhesive tensile properties and higher SAFT with a slight sacrifice of melt processability.

EXAMPLE 10

Copolymer D, an ethylene/butene-1 copolymer made by the process in Examples 1 and 2, was blended with Copolymer C in Example 7, 8 and 9 to prepare a hot melt adhesive composition based on Escorez 1310 LC and Resin C. Irganox 1010 was added as an antioxidant. Copolymer D had weight percent butene-1 of 7.5 (mole percent = 3.9), specific gravity of 0.925, melt index of 21, $M_n$ of 23,000, $M_w$ of 52,000, $M_w/M_n$ of 2.26, and CDBI of 82.07 percent. Therefore, Copolymer D has a narrow MWD/narrow CD. As shown in Table VII, a portion of this low melt index polymer, Copolymer D, was blended into the high melt index Copolymer C so that the melt index of the resulting copolymer blend was 108, identical to that of Copolymer B described in Examples 7, 8 and 9. This blend was prepared according to the two equations shown in Example 7, 8 and 9. The copolymer blend had weight percent butene-1 of 14.5 (mole percent=7.8), $M_w$ of 29,000, $M_n$ of 10,000, $M_w/M_n$ of 2.90, and CDBI of 58.40 percent. This copolymer blend had a broad CD, as reflected by its low CDBI value.

The hot melt composition contained 0.5 weight percent Irganox 1010 based on the total weight of the adhesive blend. The bonding conditions for T-Peel specimens were 150° C., 40 psi and 10 seconds for the untreated polypropylene substrate.

The HMA performance results, compared to those of Example 7, are summarized in Table VII.

TABLE VII

| Formulation | Examples | |
|---|---|---|
| | 7 | 10 |
| Copolymer C | 32.1 | 33.3 |
| Copolymer D | — | 11.7 |
| Ethylene/Butene-1 Copolymer | 12.9 | — |
| Escorez 1310LC | 30 | 30 |
| Resin C | 25 | 25 |
| Properties | | |
| Brookfield Viscosity @ 180° C. | 9.8 | 8.9 |
| SAFT, Kraft 1" × 1" × 500 g, °C., | 81 | 86 |
| Tensile Strength, psi | 170 | 150 |
| Elongation, % | 1,000 | 800 |
| T-Peel, lb/in Polypropylene | 7.0 | 5.0 |

The copolymer blend of Example 7 had a higher CDBI (or narrow CD) than the copolymer blend in Example 10. The results were enhanced bond strength with polypropylene and better adhesive tensile properties (higher tensile strength and elongation at break) for Example 7 having the narrower CD of the two.

EXAMPLES 11 and 12

Copolymer E, and ethylene/butene-1 copolymer made by the process in Examples 1 and 2, was blended with the Ethylene/Butene-1 Copolymer in Examples 1 and 2 and Copolymer C in Example 7 to prepare two hot melt adhesive compositions based on Escorez 1310LC and Resin C. Irganox 1010 was added as an antioxidant. Copolymer E had weight percent butene-1 of 5.5 (mole percent=2.9), specific gravity of 0.921, melt index of 181, $M_n$ of 9,000, $M_w$ of 25,000, $M_w/M_n$ of 2.78, and CDBI of 70.72 percent. As shown in Table VIII, two different copolymer blends using the above three copolymers were prepared so that the melt index of each copolymer blend was 108, identical to that of Copolymer B in Examples 7, 8 and 9. These two blends were prepared according to the two equations described in Examples 7, 8 and 9. They had weight percent butene-1 levels of 11.9 (mole percent=6.4) and 9.6 (mole percent= 5.0), identical $M_w$ value of 30,000, identical $M_n$ value of 8,000, identical $M_w/M_n$ value of 3.75, and CDBI values of 51.51 percent and 51.69 percent. Therefore, the blend used as the basis for Examples 11 and 12 had broad CD's as reflected by their low CDBI values and broad MWD's, as reflected by their high $M_w/M_n$ values.

The hot melt compositions contained 0.5 weight percent Irganox 1010 based on the total weight of the adhesive blend. The bonding conditions of T-Peel specimens were 150° C., 40 psi and 10 seconds for the untreated polypropylene substrate.

The results, compared to those of Example 7 in Examples 7, 8 and 9 are summarized in Table VIII.

TABLE VIII

| Formulation | Examples | | |
|---|---|---|---|
| | 7 | 11 | 12 |
| Copolymer C | 32.1 | 14.8 | 6.6 |
| Copolymer E | — | 19.2 | 28.2 |
| Ethylene/Butene-1 Copolymer | 12.9 | 11.0 | 10.2 |
| Escorez 1310LC | 30 | 30 | 30 |
| Resin C | 25 | 25 | 25 |
| Properties | | | |
| Brookfield Viscosity @ 180°C., Pa.s | 9.8 | 9.8 | 9.7 |
| SAFT, Kraft 1" × 1" × 500 g, °C. | 81 | 94 | 81 |
| Tensile Strength, psi | 170 | 290 | 340 |
| Elongation, percent | 1,000 | 900 | 800 |
| T-Peel, lb/in Polypropylene | 7.0 | 1.6 | 0.28 |

The copolymer blend in Example 7 had a higher CDBI (or narrow CD) than the two copolymer blends in Examples 11 and 12. The result was enhanced bond strength with polypropylene for Example 7 again with the narrower CD.

EXAMPLES 13 and 14

The Ethylene/Butene-1 Copolymer in Examples 1 and 2, Copolymer D in Example 10 and Copolymer E in Examples 11 and 12 were used to prepare two hot melt adhesive compositions based on Escorez 1310LC and Resin C. Irganox 1010 was added as antioxidant. As shown in Table IX, a portion of the low melt index Ethylene/Butene-1 Copolymer or Copolymer D was blended into the high melt index Copolymer E so that the melt index of both copolymer blends was 108, identical to that of Copolymer B in Examples 7, 8 and 9. These two copolymer blends were prepared according to the two equations described in Examples 7, 8 and 9. They had weight percent butene-1 levels of 7.8 (mole percent=4.1) and 5.8 (mole percent=3.0), identical $M_w$ values of 30,000, identical $M_n$ value of 9000, identical $M_w/M_n$ value of 3.33, and CDBI values of 59.77 percent and 73.42 percent. Therefore, both copolymer blends had broad MWD's, as reflected by their high $M_w/M_n$ values. However, the first copolymer blend had a broader CD than the second copolymer blend.

The hot melt compositions contained 0.5 weight percent Irganox 1010 based on the total weight of the adhesive blend. The bonding conditions for T-Peel specimens were 150° C., 40 psi and 10 seconds for the untreated polypropylene substrate.

The HMA performance results, compared to those in Example 7, are summarized in Table IX.

TABLE IX

| Formulation | Examples | | |
|---|---|---|---|
| | 7 | 13 | 14 |
| Copolymer C | 32.1 | — | — |
| Ethylene/Butene-1 Copolymer | 12.9 | 9.9 | — |
| Copolymer D | — | — | 7.8 |
| Copolymer E | — | 35.1 | 37.2 |
| Escorez 1310LC | 30 | 30 | 30 |
| Resin C | 25 | 25 | 25 |
| Properties | | | |
| Brookfield Viscosity @ 180° C., Pa.s | 9.8 | 10.8 | 8.7 |
| SAFT, Kraft 1" × 1" × 500 g, °C., | 81 | 102 | 106 |
| Tensile Strength, psi | 170 | 410 | 380 |
| Elongation, percent | 1,000 | 800 | 250 |
| T-Peel, lb/in Polypropylene | 7.0 | 0.1 | 0.05 |

The copolymer blend in Formulation 7 had a higher CDBI (or narrow CD) and a higher weight percent butene-1 level than the two copolymer blends in Examples 13 and 14. The result was enhanced bond strength with polypropylene for Example 7. Although the copolymer blend in Example 14 had a higher CDBI (or narrow CD) than that in Example 13, the bond strength with polypropylene is lower because of lower weight percent butene-1 level.

While the specific examples delineate adhesive copolymers with ethylene and the alpha-olefins of butene-1 and hexene-1, it is to be appreciated that any of the alpha-olefins having 3 or more carbon atoms are suitable in the context of the invention. Thus, propylene, pentene-1, 3-methylpentene-1,4-methylpentene-1, octene-1, and the like, and mixtures thereof typify the operable comonomers within the context of the invention. The copolymer blend can be mixture of ethylene/(alpha-olefin) 1 copolymer and ethylene/(alpha-olefin)$_2$ copolymer, and the like. Also, the foregoing examples are illustrative and explanatory of the invention and many variations in the specific details thereof will become apparent to those skilled in the art in view thereof. It is intended that all such variations within the scope or spirit of the appended claims be embraced thereby.

What is claimed is:

1. A hot melt adhesive composition comprising a blend of at least a first and a second ethylene/alpha-olefin copolymer and a tackifier, said first ethylene/alpha-olefin copolymer comprising from about 3 to about 17 mole percent of a $C_3$ to $C_{20}$ alpha-olefin comonomer and having a weight average molecular weight from about 20,000 to about 39,500, and said second ethylene alpha-olefin copolymer comprising from about 3 to about 17 mole percent of a $C_3$ to $C_{20}$ alpha-olefin comonomer and having a weight average molecular weight of from about 40,000 to about 100,000, said first and second ethylene/alpha-olefin copolymers each having a composition distribution breadth index greater than about 70% and said blend having a total alpha-olefin comonomer mole percent of from about 5 to about 17 mole percent.

2. The composition of claim 1, wherein the alpha-olefin of each of the copolymers have from 3 to 8 carbon atoms.

3. The composition of claim 2, wherein said alpha-olefin of each of the copolymers is selected from the group consisting of butene-1, hexene-1, octene-1, and 4-methyl-pentene-1.

4. The hot melt adhesive of claim 1 wherein the first or second or both ethylene/alpha olefin copolymers have a molecular weight distribution ($M_w/M_n$) of less than 4.

5. The composition of claim 1, wherein said alpha-olefin is present from about 5 to about 11 mole percent, in each of said ethylene/alpha-olefin copolymers.

6. The composition of claim 1 wherein the ethylene/alpha-olefin copolymer blend has an bimodal molecular weight distribution and a unimodal composition distribution.

7. The composition of claim 1 wherein the ethylene/alpha-olefin copolymer blend has a molecular weight distribution and composition distribution selected from the group consisting of unimodal molecular weight distribution/bimodal composition distribution, multimodal molecular weight distribution/unimodal composition distribution, unimodal molecular weight distribution/multimodal composition distribution and multimodal molecular weight distribution/multimodal composition distribution.

8. A hot melt adhesive composition comprising a blend of at least two ethylene/alpha-olefin copolymers and at least one tackifier, each copolymer having a composition distribution breadth index of greater than 70%, each copolymer comprising from about 3 to about 17 mole percent of a $C_3$ to $C_{20}$ alpha-olefin comonomer, each copolymer being obtained by polymerizing in the presence of a catalyst system comprising a transition metal catalyst component and catalyst activator, and wherein said blend has a total alpha-olefin comonomer mole percent of from about 5 to about 17 mole percent.

9. The composition of claim 8 wherein the transition metal catalyst component is supported.

10. The composition of claim 9 wherein said transition metal catalyst component is a cyclopentadienyl Group IV transition metal compound.

11. The composition of claim 10 wherein said transition metal catalyst component is one of a mono-, di- or tri-cyclopentadienyl Group IV transition metal compound.

12. The composition of claim 11 wherein said transition metal catalyst component is a monocyclopentadienyl titanium compound.

13. The composition of claim 11 wherein said transition metal catalyst component is a dicyclopentadieny titanium, hafnium or zirconium compound.

14. A hot melt adhesive composition comprising a tackifier and a blend of two ethylene/alpha-olefin copolymers each comprising from about 5 to about 11 mole percent of a $C_3$ to $C_8$ alpha-olefin, said blend comprising a first copolymer having a weight average molecular weight of from about 20,000 to about 39,500 and a second copolymer having a weight average molecular weight of from about 40,000 to 52,000, said first and second copolymers each having a composition distribution breadth index greater than about 70 percent.

15. The hot melt adhesive composition of claim 14 wherein the alpha olefin is a $C_4$ to $C_8$ alpha olefin.

16. A composition according to claim 1 wherein said tackifier comprises one or more solid tackifier resins selected from the group consisting of aliphatic resins, polyterpene resins, hydrogenated resins, mixed aliphatic-aromatic resins, and solid hydrogenated oligo(cyclopentadiene) resins.

17. A composition according to claim 16 wherein said solid tackifier resin has a softening point of from 70° C. to 130° C.

18. A composition according to claim 16 wherein said tackifier further comprises a liquid tackifier resin having a softening point of from 10° C. to 40° C.

19. The composition of claim 1 wherein said first ethylene/alpha-olefin copolymer is present at 40 to 95 weight percent, said second ethylene/alpha-olefin copolymer is present at 5 to 60 weight percent, and said tackifier is present at 10 to 90 weight percent, each of said weight percentages based upon the total weight of the blend and the tackifier.

20. The composition of claim 14 wherein said first ethylene/alpha-olefin copolymer is present at 40 to 95 weight percent, said second ethylene/alpha-olefin copolymer is present at 5 to 60 weight percent, and said tackifier is present at 10 to 90 weight percent, each of said weight percentages based upon the total weight of the blend and the tackifier.

21. A composition according to claim 20 wherein said tackifier comprises one or more solid tackifier resins selected from the group consisting of aliphatic resins, polyterpene resins, hydrogenated resins, mixed aliphatic-aromatic resins, and solid hydrogenated oligo(cyclopentadiene) resins.

* * * * *